United States Patent [19]
Etcheverry et al.

[11] 3,734,128
[45] May 22, 1973

[54] PNEUMATIC DUMP VALVE

[75] Inventors: John P. Etcheverry, Sylmar; James B. Doolittle, Burbank, both of Calif.

[73] Assignee: International Telephone and Telegraph Corporation, New York, N.Y.

[22] Filed: Sept. 30, 1971

[21] Appl. No.: 185,235

[52] U.S. Cl. ............................ 137/596.2, 137/625.64
[51] Int. Cl. ............................................. F16k 11/10
[58] Field of Search ...................... 137/625.64, 540, 137/543.19, 596.2

[56] References Cited

UNITED STATES PATENTS

| 2,902,052 | 9/1959 | Ohlsson | 137/625.64 |
| 3,016,065 | 1/1962 | Stampfli | 137/625.64 |
| 3,051,198 | 8/1962 | Martin | 137/625.64 |
| 3,188,148 | 6/1965 | Eaton | 137/625.64 X |
| 3,263,702 | 8/1966 | Pullen et al | 137/625.64 |
| 3,458,769 | 7/1969 | Stampli | 137/625.64 X |
| 3,566,920 | 3/1971 | Stewart | 137/625.64 |
| 3,430,646 | 3/1969 | Vick | 137/540 X |

FOREIGN PATENTS OR APPLICATIONS

| 195,483 | 5/1938 | Switzerland | 137/543.19 |

Primary Examiner—Henry T. Klinksiek
Attorney—C. Cornell Remsen, Jr. et al.

[57] ABSTRACT

A valve for controlling the flow of fluid from an inlet to an outlet of a valve body. The valve comprises a valve stem member having a diaphragm at one end of the stem. The stem passes through a central portion of the diaphragm and an outer edge surface of the diaphragm is secured to the valve body. A valve element is mounted on the stem in a plane perpendicular to the axis of the stem, with the stem passing through a central opening in the element. A valve seat is formed in the valve body with the valve element being movable between a first and second position, to permit the valve element to prevent or allow the flow of fluid from the inlet to the outlet, respectively. A pilot valve comprises a solenoid which has an opening which allows atmospheric pressure to be coupled to one side of the diaphragm. Further, energization of the solenoid causes a pilot valve element to close the solenoid opening and allow inlet pressure to be coupled to the one side of the diaphragm. Further, a check valve allows pressure in the outlet side of the valve to be released when the valve element seals the inlet from the outlet.

6 Claims, 3 Drawing Figures

PATENTED MAY 22 1973

3,734,128

PNEUMATIC DUMP VALVE

The invention relates in general to a pneumatic dump valve and, more particularly, to a rapid response valve for use in anti-skid system.

BACKGROUND OF THE INVENTION

Conventional pneumatic dump valves are used in anti-skid systems of vehicle air brake systems. Under normal conditions, the valve acts as a normally open conduit to a truck wheel air brake diaphragm. When an impending skid is sensed by a sensor, the valve receives electrical signals at a high cyclical rate. At each signal the valve must close off the brake pressure inlet while simultaneously bleeding the brake actuator to atmosphere. In such systems, the rapid response, dump flow rate, and long life are among design considerations.

Prior art pneumatic dump valves have had various disadvantages. The pilot valve was made normally open which required greater solenoid pull as the operating pressure increased, thus slowing response time. Further, the diaphragm was constantly pressurized, thus decreasing life expectancy of the valve. Moreover, a large thick diaphragm with relatively large displacement was utilized requiring correspondingly larger pilot valve capacity, or, if the larger valve capacity was not provided, slower response time was incurred. Also, a protective boot was used to cover the entire valve. The boot would prevent entry of moisture into the exhaust port, and the boot flapper, which was used as an exit for the exhaust air, had a very short life.

In order to overcome the attendant disadvantages of prior art pneumatic dump valves, the present invention provides faster solenoid response as inlet pressure is increased by use of a normally closed pilot valve. Further, to increase life of the main valve, the valve diaphragm is only pressurized during the control cycle. Moreover, the diaphragm, which is used in conjunction with the operating piston, provides rapid valve actuation by use of a low displacement, frictionless diaphragm. Moreover, a check valve at an exhaust port provides protection from dirt, moisture, and slush, as well as being able to open during icing conditions.

The advantages of the invention, both as to its construction and mode of operation, will be readily appreciated as the same becomes better understood by reference to the following detailed description when considered in connection with the accompanying drawings in which like referenced numerals designate like parts throughout the figures.

DESCRIPTION OF THE PREFERRED EMBODIMENT

Figure 1:
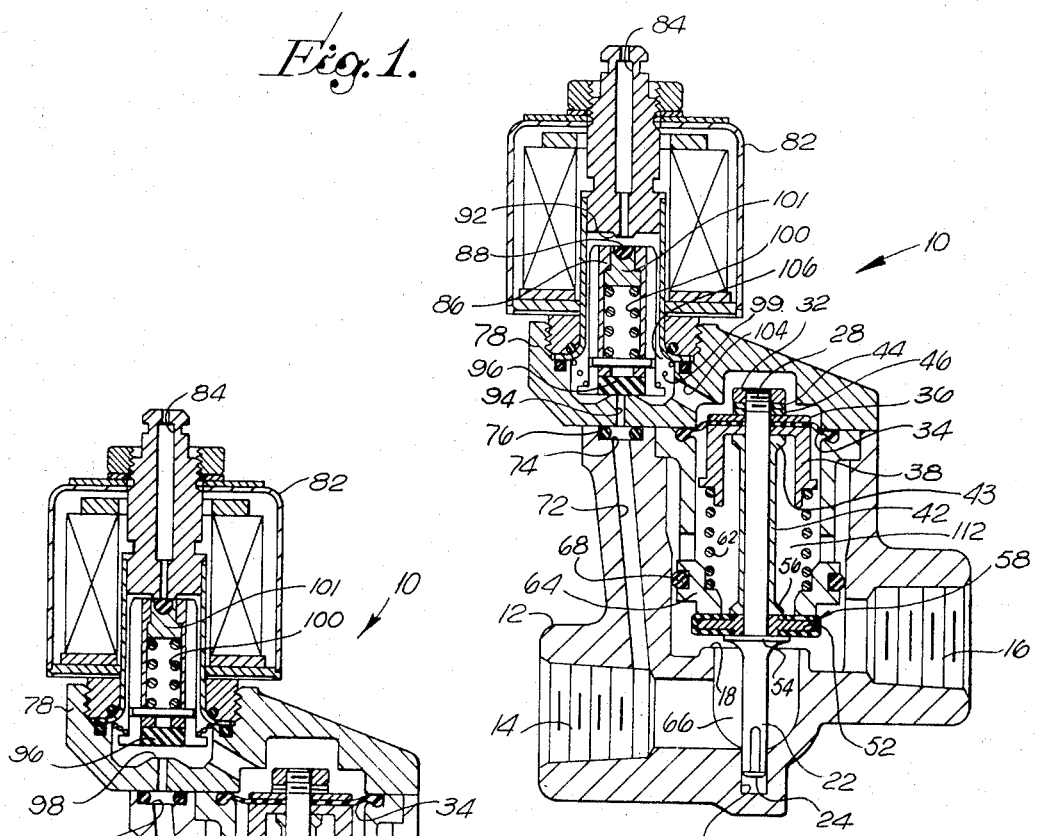
FIG. 1 depicts a cross-sectional view of the valve in a first operation position.

Referring now to the drawings there is shown in FIG. 1 a preferred embodiment of the pneumatic dump valve made in accordance with the invention. The valve 10 is normally formed of a valve body 12 having an inlet passage 14 and an outlet passage 16. A valve seat 18 is formed in the valve body. Further, a movable valve stem 22 is mounted in the body. The bottom end 24 of the valve stem is movable in an opening 26 formed in the valve body. The top end 28 of the valve stem is threaded so that a nut 32 may be secured thereon. A diaphragm member 34 has a central opening through which the valve stem passes. Further, the diaphragm is secured to the valve stem 22 near the top end 28 by means of a plate 36 and the bottom surface of a generally cylindrical cup 38 which forms a sandwich structure between which the diaphragm 34 is mounted. Further, the outer edge of the diaphragm is fixed to the valve body.

An outer cylindrical member 42 surrounds the valve stem 22 and its flared end 43 is fixed to the inner bottom surface of the cup 38. The nut 32 has a pair of washers 44, 46, thus securing the plate 36 on the stem 22. A valve element 52 has a central opening through which the stem passes. The valve element is fixed to the stem 22 and is positioned with respect to the stem by means of a flange 54 formed on the stem 22 and the flared end 56 of the cylindrical member 42. The outer surface of the element 52 contains a gasket material 58, such as rubber, which is bonded thereto.

A spring 62, mounted between a flange member 64 and the cup 38 assures that the valve passageway 66 between the inlet 14 and the outlet 16 is normally open. Further, an O-ring 68 is mounted on the outer surface of the flange 64 to provide a seal between the flange 64 and the valve body.

Figure 2:
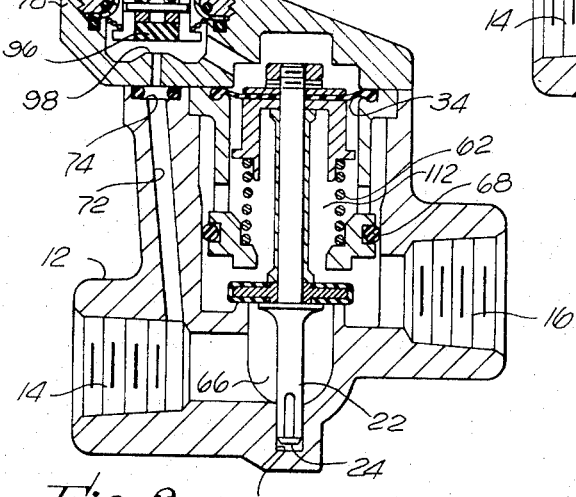
FIG. 2 illustrates a cross-sectional view of the valve in a second operation position.

An inlet bypass 72 interconnects the inlet passageway 14 to an opening 74 formed at the top end of the valve body. Also mounted in the opening 74 is an O-ring 76 which provides an effective seal between the opening and the top valve cover 78. Secured to the top valve cover is a solenoid 82. The solenoid 82 contains a passageway 84 axially extending through the center thereof, which provides a communication with the atmosphere. Excitation of the solenoid causes a poppet assembly 86 to move in an upward direction, shown in the drawing to a position depicted in FIG. 2. A rubber seal 88 mounted in the poppet assembly then abuts a seat 92 causing the passageway 84 to be closed off from the interior of the valve. Further, the valve cover 78 contains a passageway 94 which communicates with the opening 74 of a pilot valve and is normally closed by means of a valve element 96 which abuts a seat 98 formed on the top end of the valve cover. The plunger 86 is normally positioned in that position shown in FIG. 1 by means of a spring 99. Further, a spring 100 in poppet assembly 86 upwardly urges a mount 101 in which the rubber seal 88 is mounted.

A passageway 104 interconnects to a chamber 106 formed in the solenoid. The chamber 106, in turn, is normally in communication with the passageway 84, as shown in FIG. 1. Thus, normally, the top side of the diaphragm 34 is in communication with atmosphere through a passage formed by passageway 104, chamber 106, and passageway 84.

Figure 3:
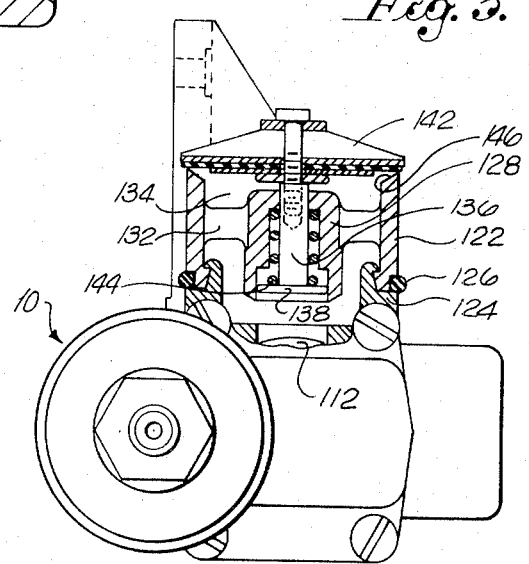
FIG. 3 shows an elevational view of the valve of FIG. 1 and 2 with a cross-section of a portion of the check valve.

Referring now to FIG. 3, there is shown a check valve assembly which communicates with a chamber 112 formed in the main valve of the valve body below the diaphragm 34. The check valve is formed of a cylindrical member 122 which is interconnected to a flange portion 124 of the valve body. An O-ring 126 may be used to secure the flange portion 124 to the member 122. A central housing member 128 is connected to the cylindrical member 122 by means of a plurality of legs 132 which allows a passageway 134 to be formed in the check valve. The passageway 134 communicates directly with the chamber 112 in the valve body. A valve stem 136 is formed in the valve body and contains a flange member 138 at its lower end. The stem is interconnected to a valve plate 142 and a spring member 144 causes the valve plate 142 to be normally closed and abut a valve seat 146. The valve seat 146 is tapered to a sharp point allowing the valve plate 142 to separate and contact the seat 146 in adverse weather conditions such as icing.

Under normal conditions, the valve 10 acts as a normally open conduit to a truck wheel air-brake diaphragm. When an impending skid is sensed, the solenoid 82 is actuated via electrical signals from a sensor at a high cyclical rate. At each signal, the solenoid is energized causing poppet assembly 86 to move upward, and the rubber seal 88 closes the passageway 84. Thus, atmospheric pressure is no longer connected to the chamber 106. Simultaneously, the valve element 96 no longer abuts the seat 98 and fluid from the inlet 14 passes through the inlet bypass 72, the passageway 94, the chamber 106, the passageway 104, thus applying a pressure of the backside of diaphragm 34. The diaphragm 34 thereby moves in a downward direction, achieving position shown in FIG. 2 and causing the valve element 52 to close the passageway 66 so that fluid can no longer pass from the inlet 14 to the outlet 16.

The diaphragm 34 has a larger effective area under pressure than the valve element 52 and forces the stem 22 to move downwardly as shown in the drawings. Thus, the element 52 no longer abuts the flange 64 and moves so that an effective seal is formed with the seat 18. Simultaneously, the remaining pressure in the chamber 112 connected to the outlet 16, passes through the check valve and its passageway 134, forcing the valve plate 142 to separate from the valve seat 146. Since the check valve is open only during air flow to atmosphere, dirt and moisture are unable to enter the valve.

Moreover, it should be noted that since the poppet assembly 86 is spring loaded against system pressure by means of the spring 99, higher pressure assists the solenoid operation, speeding response as well as reducing the voltage needed for operation of the solenoid.

What is claimed is:

1. A rapid response valve for controlling the flow of fluid comprising:
    a valve body having an inlet and an outlet;
    a main valve and pilot valve means in said valve body;
    said main valve including a movable valve stem having a main diaphragm secured thereto adjacent to the upper end of said stem, the outer edge of said diaphragm being secured to the valve body, a chamber in said valve body above said diaphragm, a valve element being mounted on said stem adjacent the lower end thereof and lying in a plane perpendicular to the axis of such stem, a valve seat being formed in said valve body below said diaphragm and between said inlet and said outlet, said valve element being movable to a first predetermined position wherein said valve element abuts said valve seat and prevents the flow of fluid from said inlet to said outlet, and spring means normally biasing said valve element to a second predetermined position spaced from said valve seat wherein said fluid can flow from said inlet to said outlet;
    said pilot valve means comprising a solenoid coil having a bore therein, first and second ports communicating with said bore, said first port communicating to atmospheric pressure, a pilot valve element slidable in said bore to close one port and open the other port and vice versa, said first port being open when said solenoid coil is deenergized and closed when said solenoid coil is energized;
    a first passageway in said valve body communicating said bore in a region between said ports to said chamber;
    a second passageway in said valve body communicating the inlet of said valve body to said second port; and
    said pilot valve closing said second port and allowing said atmospheric pressure to be connected to said chamber through said first port, said bore and said first passageway when said solenoid coil is deenergized, said inlet being connected to said chamber through said second passageway, said second port, said bore and said first passageway when said solenoid coil is energized.

2. A valve in accordance with claim 1 and further comprises check valve means, said check valve means including a second chamber formed in the main valve of the valve body below said diaphragm, said outlet being connected to said second chamber when said main valve element is in said first predetermined position.

3. A valve in accordance with claim 2, wherein said check valve means comprises a check valve seat and a check valve element biased so as to normally abut said check valve seat, movement of said main valve element to said first predetermined position permitting fluid pressure in said outlet to enter said second chamber and exit the valve body through said check valve means.

4. A valve in accordance with claim 1 wherein said ports are located at opposite ends of said bore, the opposite ends of said pilot valve element being adapted to close a corresponding port at said ends.

5. A valve in accordance with claim 1 wherein:
    said valve seat of said main valve faces toward said diaphragm;
    said valve body being formed to provide a flange between said valve element and said diaphragm; and
    said spring means comprising a spring positioned between said flange and said diaphragm.

6. A valve in accordance with claim 5 wherein:
    said flange is annular and surrounds said valve stem; and
    said spring comprises a coil spring surrounding said stem and engaging said annular flange.

* * * * *